(12) United States Patent
Perkins et al.

(10) Patent No.: US 11,945,575 B2
(45) Date of Patent: Apr. 2, 2024

(54) LANDING GEAR ASSEMBLY

(71) Applicants: AIRBUS OPERATIONS LIMITED, Bristol (GB); AIRBUS OPERATIONS (S.A.S.), Toulouse (FR)

(72) Inventors: Christopher James Perkins, Bristol (GB); Marco Boscolo, Bristol (GB); Nicholas White, Bristol (GB); Xavier Matheis, Toulouse (FR); Alexandre Legardez, Toulouse (FR); Simon Roux, Toulouse (FR); Sébastien Crouzet, Toulouse (FR)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 177 days.

(21) Appl. No.: 17/296,788

(22) PCT Filed: May 19, 2020

(86) PCT No.: PCT/EP2020/063997
§ 371 (c)(1),
(2) Date: May 25, 2021

(87) PCT Pub. No.: WO2020/234314
PCT Pub. Date: Nov. 26, 2020

(65) Prior Publication Data
US 2022/0009620 A1    Jan. 13, 2022

(30) Foreign Application Priority Data

May 20, 2019   (GB) ..................................... 1907114

(51) Int. Cl.
*B64C 25/10*   (2006.01)
*B64C 25/04*   (2006.01)

(52) U.S. Cl.
CPC .............. *B64C 25/10* (2013.01); *B64C 25/04* (2013.01)

(58) Field of Classification Search
CPC .... B64C 25/10; B64C 25/04; B64C 2025/125
See application file for complete search history.

(56) References Cited

U.S. PATENT DOCUMENTS 3,687,400 A * 8/1972 Fitzgerald ............... B64C 25/34
244/102 R
3,951,361 A   4/1976 Hrusch
(Continued)

FOREIGN PATENT DOCUMENTS

DE        746811       12/1944
EP      0 031 602       7/1981
(Continued)

OTHER PUBLICATIONS

International Search Report for PCT/EP2020/063997, dated Sep. 2, 2020, 4 pages.
(Continued)

*Primary Examiner* — Rodney A Bonnette
(74) *Attorney, Agent, or Firm* — Nixon & Vanderhye P.C.

(57) ABSTRACT

A retractable fuselage mounted landing gear assembly is disclosed. The landing gear assembly includes a main strut, a drag stay and a landing gear main fitting. A first end of the drag stay is attached to the main strut and a second end of the drag stay is connected to the fuselage. A first end of the landing main fitting is attached to the main strut and a second end of the main fitting is connected to the fuselage. When the landing gear is extended, substantially all the landing gear loads are transferred from the landing gear to the fuselage via one or more of the drag stay and the main fitting.

15 Claims, 7 Drawing Sheets

(56) References Cited

U.S. PATENT DOCUMENTS

| | | |
|---|---|---|
| 2005/0178900 A1 | 8/2005 | Quayle |
| 2009/0057484 A1 | 3/2009 | White |
| 2012/0168561 A1 | 7/2012 | Salmon et al. |
| 2012/0217341 A1 | 8/2012 | Bennett |
| 2014/0151500 A1* | 6/2014 | Bellet .................. B64C 25/10 244/102 A |
| 2018/0037314 A1* | 2/2018 | Wilson .................. B64C 25/04 |
| 2020/0331595 A1* | 10/2020 | Block .................. B64C 25/12 |

FOREIGN PATENT DOCUMENTS

| | | |
|---|---|---|
| EP | 1 041 000 | 10/2000 |
| EP | 2 738 088 | 6/2014 |
| EP | 3279083 | 2/2018 |
| GB | 1 210 451 | 10/1970 |
| GB | 1 4900 88 | 10/1977 |
| GB | 2563826 | 1/2019 |
| WO | 01/19672 | 3/2001 |
| WO | 2013/133839 | 9/2013 |

OTHER PUBLICATIONS

Written Opinion of the ISA for PCT/EP2020/063997, dated Sep. 2, 2020, 6 pages.
Combined Search and Examination Report for GB1907114.1, dated Nov. 1, 2019, 8 pages.

\* cited by examiner

LANDING GEAR ASSEMBLY

CROSS REFERENCE TO RELATED APPLICATIONS

The present application is a National Phase of International Application Number PCT/EP2020/063997 filed May 19, 2020, which designated the U.S. and claims priority benefits from Great Britain Application Number GB 1907114.1 filed May 20, 2019, the entire contents of each of which are hereby incorporated by reference.

BACKGROUND OF THE INVENTION

The present invention concerns an aircraft landing gear. More particularly, but not exclusively, this invention concerns aircraft comprising a landing gear mounted to the fuselage via a drag stay and a landing gear main fitting, a landing gear suitable for use in such an aircraft and a method of retracting such a landing gear.

The positioning of the main landing gear of an aircraft is dictated to a large extent by the need to ensure stability during taxiing, take-off and landing.

Significant loads are experienced at the point of attachment of the landing gear to the airframe as landing gear loads are transferred from the landing gear to the rest of the aircraft. Often additional structural reinforcement is required in these areas in order to allow the airframe to support the landing gear loads. The provision of such reinforcement may increase the weight of the aircraft. Accordingly, it would be advantageous to provide a landing gear that reduces the amount of additional structural reinforcement required on the aircraft.

The need to deal with landing gear loads at the point of attachment of the landing gear to the airframe is a particular issue for wings using composite materials, for example Carbon Fibre Reinforced Polymer (CFRP) wings, as these materials are typically anisotropic. For example, CFRP materials can withstand higher loading along the fibre length, but may require substantial reinforcement to accommodate off-axis loads. Loads that may be accommodated by a metal structure may therefore require additional reinforcement when that same structure is made using a composite. This may further increase the weight of the structure and/or lead to manufacturing difficulties when attempting to lay up composite regions which are very thick, or which have a complicated shape. In the case of wing-mounted landing gear, the need to accommodate the structure necessary to react landing gear loads within the wing may also place constraints on the shape of wing that can be used. Accordingly, it would be advantageous to provide a landing gear that reduces the landing gear loads transmitted to the wing, without adversely impacting on the stability on the aircraft during taxiing, take-off and landing.

One prior art method of reducing the loads experienced at any one point of attachment is to provide a landing gear which transfers loads from the landing gear to the aircraft over multiple attachment points including points on both the wing and the fuselage. EP 0 031 602 describes such a landing gear which is attached to the aircraft at four points, namely via two trunnion bearings at the top of the main strut attaching the landing gear to the wing, a drag strut and a side strut attaching the landing gear to the wing/body. While this four-point structure may provide some loads reduction, significant off axis loads are still transferred to the wing. In particular, when drag loads are transmitted to the wing via the two trunnion bearings (also known as fore and aft pintles) this generates a significant bending moment between the two trunnion joints in the wing.

Typically, modern landing gear are retracted once the aircraft is in flight. Space is at a premium within the envelope of the aircraft, and particularly in the wing and accordingly it is desirable that a landing gear can be retracted into a compact configuration. However, many multiple attachment point landing gears are not particularly compact when retracted and/or are mechanically complex thereby increasing manufacture and/or maintenance costs. It would be advantageous to provide a mechanically simple landing gear that can reduce the maximum loads experienced at the point of attachment to the aircraft while reducing the amount of space such a landing gear occupies in the wing when retracted.

The present invention seeks to mitigate one or more of the above-mentioned problems. Alternatively or additionally, the present invention seeks to provide an improved landing gear.

SUMMARY OF THE INVENTION

The present invention provides, according to a first aspect, an aircraft comprising a fuselage and landing gear assembly (which may also be referred to as a landing gear herein) mounted on the fuselage. The landing gear assembly may comprise a main strut. The landing gear assembly may comprise a drag stay, a first end of the drag stay being attached to the main strut. A second end of the drag stay may be connected to the fuselage such that landing gear loads can be transferred into the fuselage of the aircraft from the drag stay. The landing gear assembly may comprise a landing gear main fitting. A first end of the landing main fitting may be attached to the main strut. A second end of the main fitting may be connected to the fuselage such that landing gear loads can be transferred into the fuselage of the aircraft from the landing gear main fitting. It may be that, in use, when the landing gear is in an extended configuration, substantially all the landing gear loads are transferred from the landing gear to the fuselage via one or more of the drag stay and the main fitting.

Landing gear in according with the present invention may allow landing gear loads to bypass the wing, thereby allowing more design freedom for the wing shape. Further providing a landing gear connected to the fuselage via a drag stay and main landing gear fitting may allow the main strut to be located aft of the wing and/or outboard of the airframe of the fuselage when the landing gear is extended thereby providing stability during taxiing, take-off and/or landing.

Landing gear loads may be defined as drag loads, lateral loads and vertical loads experienced by the landing gear when the gear is extended. The landing gear may be arranged such that substantially all these loads experienced by the landing gear are transferred to the aircraft via the drag stay and the main fitting.

Each of the drag stay and main fitting may be connected to the aircraft to cause landing gear loads to be transferred from the landing gear to the aircraft. Each of the drag stay and main fitting may provide a landing gear load path between the main strut and the relevant point(s) of attachment to the aircraft. Thus, the landing gear may be configured to have two principle landing gear load paths via which landing gear loads are transferred to the aircraft; the drag stay load path and the main fitting load path. It may be that the drag stay and landing gear main fitting are not connected to the aircraft via the wing. Thus, it may be that landing gear loads are transferred by the drag stay and the landing gear main fitting to the fuselage bypassing the wing.

The landing gear may be a retractable landing gear. The landing gear may be mounted for movement between an extended configuration (e.g. for taxiing, take-off and/or landing) and a retracted configuration (e.g. for cruise) relative to the fuselage of the aircraft. The main strut may be said to be in the extended position or retracted position relative to the fuselage of the aircraft when the landing gear is in the extended configuration or retracted configuration respectively.

The aircraft may comprise a wing. The wing may include one or more spars, for example a rear spar, and/or one or more ribs. It may be that the main strut is aft of the rear spar at the location of the main strut, and optionally aft of the wing, for example the trailing edge of the wing, at the location of the main strut when the strut is in the extended position. The main strut may be aft of the rear spar/wing at the spanwise location of the main strut. For example in the case that the rear spar and/or wing is not parallel to the lateral axis of the aircraft, it is not necessary that the main strut be aft of the rearmost portion of the spar/wing, it is sufficient that it is aft of the spar/wing in the region of the main strut.

The fuselage may comprise an airframe (e.g. the mechanical structure of the fuselage) upon which, for example, any fairings may be mounted. It may be that the main strut is outboard of the airframe when the strut is in the extended position. Providing a landing gear having a main strut aft of the wing and/or outboard of the fuselage may allow for good stability during taxiing, take-off and/or landing. The aircraft may comprise one or more fairings arranged to fair the landing gear in the extended and/or retracted configuration. For example, the aircraft may comprise a belly fairing arranged to fair at least part of the landing gear main fitting when the landing gear is extended.

The second end of the drag stay may be connected to a point located on or within the fuselage, for example a point located on or within the airframe of the fuselage. The second end of the drag stay may be connected to the fuselage in the region where the wing joins the fuselage. For example the second end of the drag stay may be connected to a point adjacent the wing, for example adjacent and/or aft of the rear spar of the wing.

The second end of the drag stay may be connected to the airframe structure that connects the wing and fuselage. The region where the wing joins the fuselage is already highly reinforced and accordingly less additional structural reinforcement may be required when landing gear loads are transferred into the aircraft in this region. Accordingly, connecting the landing gear to the region of fuselage adjacent the wing may reduce the need for structural reinforcement and thereby reduce the weight of the aircraft. The second end of the drag stay may be connected to a point spaced apart (along the vertical and/or longitudinal axis of the aircraft) from the wing, for example from the rear spar of the wing, by a distance of no more than 10 percent, for example no more than 5 percent of the length of the root chord of the wing. The second end of the drag stay may be connected to part of the structure of the wing located on or within the envelope defined by the airframe of the fuselage. A rib (sometimes referred to as 'Rib 1') may intersect with the fuselage at the point where the wing joins the fuselage. The second end of the drag stay may be connected to Rib 1. Rib 1 is a particularly reinforced area of the aircraft and accordingly connection of the drag stay here may further reduce the need for any structural reinforcement.

The drag stay may be configured to transfer the majority of the drag load experienced by the landing gear into the aircraft. The drag stay may be configured such that the length of the drag stay can vary as the main strut moves between the extended and retracted positions, for example the drag stay may be a folding drag stay or a telescopic drag stay. A folding drag stay may comprise two or more members pivotally connected to each other. One end of a first member may be connected to the fuselage. One end of a second member may be mounted to the main strut. The first and second members may be pivotally connected at their second ends. The landing gear assembly may comprise a lock member configured to prevent pivoting of the members relative to each other when the lock member is engaged. The drag stay may be pivotally connected to the fuselage and/or the main strut such that the drag stay can rotate about its longitudinal axis (being the longitudinal axis of the drag stay when the landing gear is in the extended configuration) during retraction of the landing gear. Provision of a variable length and/or rolling drag strut may facilitate retraction of the landing gear to a compact configuration.

The drag stay may extend forward of the main strut and/or inboard from the main strut. Thus the second end of the drag stay may be located forward and/or inboard of the first end of the drag stay. The point at which the drag stay is connected to the fuselage may be located forward of the main strut and/or inboard of the main strut when the main strut is in the extended position. The drag stay may be connected to a bracket attached to the fuselage of the aircraft, for example attached to the airframe, for example on Rib 1.

The landing gear main fitting may be connected to the fuselage via a fuselage main fitting attached to the fuselage. The fuselage main fitting may comprise a main beam connected to the landing gear main fitting and attached to the fuselage. The fuselage main fitting may comprise a plurality of supporting members, for example rods, connected to the main beam at one end and attached to the fuselage, for example on the airframe of the fuselage, at the other end. Thus, at least part of the landing gear loads transmitted to the main beam from the landing gear main fitting may be transmitted to the fuselage via the supporting members. Provision of a main beam and a plurality of supporting members may allow for a reduction in the amount of material (and therefore the weight) of the main fitting by allowing the amount of material in each member and/or the beam to be reduced to the minimum required to react the load in each given direction. Additionally or alternatively having such a main fitting allows for multiple points of connection to the fuselage and/or allows for the points via which the main fitting is connected to the fuselage to be moved to areas of structural strength, thereby reducing the need for additional reinforcement.

The aircraft may include a bulkhead, for example a pressure bulkhead, for example an aft or rear pressure bulkhead. The landing gear main fitting may be connected to the fuselage via the bulkhead. For example, the fuselage main fitting, for example the main beam, may be attached to the fuselage at, for example on, the bulkhead. The fuselage may include one or more reinforcing members for example rods, struts and/or ribs in addition to those that would otherwise be required in a fuselage not having a landing gear mounted thereon. The reinforcing members may be configured to react the load exerted on the fuselage by the landing gear, for example by the fuselage main fitting and/or drag stay.

The landing gear main fitting may be pivotally connected to the fuselage, for example to the fuselage main fitting, for rotation about a landing gear axis such that the main strut can be rotated between the extended and the retracted positions. The landing gear main fitting and fuselage main fitting may be hingedly connected to allow for rotation about a single axis—the landing gear axis. One of the landing gear main fitting and fuselage main fitting (for example the distal end of the main beam, i.e. the end of the main beam located further from the fuselage) may comprise a pintle while the other of the landing gear main fitting and fuselage main fitting comprise a gudgeon such that the pintle and gudgeon together form a hinge. Alternatively, other forms of hinge may be used.

The landing gear axis may be inclined with respect to the longitudinal axis and/or the lateral axis of the aircraft. Providing an inclined landing gear axis may facilitate retraction of the landing gear into the fuselage by providing an improved retraction kinematic. For example, by varying the inclination with respect to both the longitudinal axis and the lateral axis during the design process the location of the distal end of the main strut (and any wheels mounted thereon) when the landing gear is in the retracted configuration can be varied to take account of the space available in the aircraft. The landing gear axis may be inclined with respect to the lateral and longitudinal axes of the aircraft such that the distal end of the main strut moves inboard and forward as the main strut rotates between the extended and retracted positions. The landing gear axis may be inclined, for example substantially perpendicular, with respect to the vertical axis of the aircraft such that the distal end of the main strut moves upward as the main strut rotates between the extended and retracted positions. The distal end of the main strut may be defined as the end of the main strut located furthest from the fuselage when the main strut is in the extended position (and/or the landing gear is in the extended configuration).

The landing gear axis may be inclined by at least 10 degrees, for example at least 15 degrees, for example at least 20 degrees with respect to one or both of the lateral and longitudinal axes. The angles given here refer to the magnitude of the acute angle formed between the landing gear axis and the lateral or longitudinal axis. The landing gear axis may be inclined at approximately 45 degrees to the longitudinal and lateral axes of the aircraft. The landing gear axis may be located nearer to the proximal end of the main strut than the distal end of the main strut. The proximal end of the main strut may be defined as the end of the main strut closest to the fuselage when the main strut is in the extended position and/or the landing gear is in the extended configuration. The landing gear axis may be located in the region of the proximal end of the main strut. The drag stay may be attached to the main strut closer to the distal end of the main strut that the landing gear axis.

The landing gear may comprise a wheel assembly mounted at the distal end of the main strut. The wheel assembly may comprise a pair of wheels, for example in a diablo arrangement. The wheel assembly may comprise further pairs of wheels, for example the wheel assembly may comprise a bogie having two or more pairs of wheels.

When the landing gear is in the retracted configuration, at least part of, for example the majority of, for example substantially all of, the wheel assembly may be received within the fuselage/fuselage airframe, for example within a recess, for example a landing gear bay, defined within the fuselage/fuselage airframe. The landing gear axis may be inclined with respect to the lateral and/or longitudinal axis of the aircraft such that the distal end of the main strut moves inboard, forward and upward as the main strut moves from the extended position to the retracted position thereby allowing the wheels to move into the landing gear bay. The aircraft may comprise one or more landing gear bay doors arranged to cover the landing gear bay when the aircraft is in flight. The landing gear bay may be located in a region aft of the wing, for example the rear spar of the wing.

The aircraft may be a commercial passenger aircraft (for the purposes of this application the term commercial passenger aircraft is also taken to include aircraft of the same type configured for cargo transport), for example an aircraft capable of transporting more than 50, for example more than 100 passengers. The aircraft may be a low wing aircraft (i.e. an aircraft in which the wing root is located at or below the point at which the fuselage is at its widest).

The main strut may be the main leg of the landing gear. The main strut may be configured to carry loads from the wheels (if present) to the landing gear main fitting and/or drag stay. The main strut may comprise a shock absorber, for example the housing of the shock absorber. The landing gear main fitting may be integrally formed with the main strut, for example with the housing of the shock absorber.

The aircraft may further comprise a nose landing gear. The aircraft may comprise first and second landing gear assemblies as described above, one landing gear assembly being located on either side of the fuselage. The two landing gear assemblies may form part of the main landing gear assembly of the aircraft. It may be that the aircraft does not include a wing-mounted landing gear assembly.

An aircraft may have a vertical (yaw or normal) axis extending vertically. An aircraft may have a lateral (transverse or pitch) axis extending across the width of the aircraft. An aircraft may have a longitudinal (or roll) axis extending along the length of the aircraft. As used herein, forward refers to an element being located closer to the front (i.e. nose) of the aircraft along the longitudinal axis of the aircraft, while aft refers to an element being located further from the front (i.e. nose) of the aircraft along the longitudinal axis of the aircraft. Outboard refers to an element being closer to the wingtip/further from the centreline of the aircraft along the lateral axis (or in a spanwise direction), while inboard refers to an element being closer to the centreline of the aircraft/further from the wing tip.

According to a second aspect of the invention there is also provided a landing gear assembly comprising a main strut having at least one pair of wheels mounted at a first end, each pair of wheels being arranged to rotate about a wheel axis. The landing gear assembly may further comprise a drag stay, a first end of the drag stay being attached to the main strut and a second end of the drag stay being configured for connecting to the fuselage of an aircraft. The landing gear assembly may further comprise a main fitting for connecting the landing gear to the fuselage of an aircraft, the main fitting being attached to the main strut and defining a pivot axis about which the main strut can rotate, for example when moving between the extended configuration and the retracted configuration. It may be that the pivot axis is neither parallel nor perpendicular with each wheel axis.

According to a third aspect of the invention there is also provided an aircraft having a fuselage and a landing gear assembly in accordance with the second aspect, the second end of the drag stay and the main fitting being connected to the fuselage of the aircraft. The pivot (or landing gear) axis may be inclined with respect to both the longitudinal and lateral axes of the aircraft, as discussed above. The pivot (or landing gear) axis may be inclined with respect to the vertical axis of the aircraft.

According to a fourth aspect of the invention there is provided a method of retracting a landing gear assembly mounted on an aircraft comprising a fuselage having an airframe, the landing gear assembly comprising a main strut connected to the fuselage by a drag stay and a main fitting, the method comprising the steps of rotating the main strut about a landing gear axis to move the landing gear from the extended configuration to the retracted configuration.

It may be that in the extended configuration the main strut (and any wheel assembly mounted thereon) is located outboard of the airframe of the fuselage and/or aft of the rear spar of the wing.

The fuselage may comprise a recess, for example a landing gear bay, defined therein. It may be that in the retracted configuration at least a portion of the wheel assembly of the landing gear is received in the recess.

It may be that the rotation of the main strut about the landing gear axis causes the distal end of the main strut (and any wheel assembly mounted thereon) to move forward, upward and inboard, for example such that the wheel assembly (or part thereof) can be received in the recess.

It may be that the length of the drag stay varies, for example reduces, as the landing gear moves from the extended to the retracted configuration (and vice versa as the landing gear moves from the retracted to the extended configuration). The drag stay may fold as the landing gear moves from the extended to the retracted configuration. The drag stay may unfold as the landing gear moves from the retracted to the extended configuration. The drag stay may rotate (or roll) about its longitudinal axis as the landing gear moves between the extended and the retracted configuration.

It may be that the landing gear main fitting (and therefore the main strut) pivots about the fuselage main fitting, for example the outboard end of the fuselage main fitting, for example the outboard end of the main beam, as the landing gear moves from the extended to the retracted configuration (and/or from the extended to the retracted configuration).

According to a fifth aspect of the invention, there is provided an aircraft comprising one or more of: a fuselage having an airframe; two main landing gear assemblies, each mounted on the fuselage, one mounted on either side of the fuselage, each main landing gear assembly comprising a main strut connected to the fuselage by a drag stay and a main fitting; and two wings, each wing having a rear spar. It may be that, in use, when the main landing gear assemblies are in an extended configuration in relation to the fuselage, the main struts are located outboard of the airframe and aft of the rear spar of the wing. The aircraft may further comprise a nose landing gear assembly.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which:

FIG. 5 shows a plan view of the underside of a portion of the aircraft of FIG. 1 when the landing gear is in the (a) extended and (b) retracted configurations respectively; and FIG. 6 shows a side view of a portion of the aircraft of FIG. 1 when the landing gear is in the (a) extended and (b) retracted configurations respectively.

DETAILED DESCRIPTION

Figure 1:
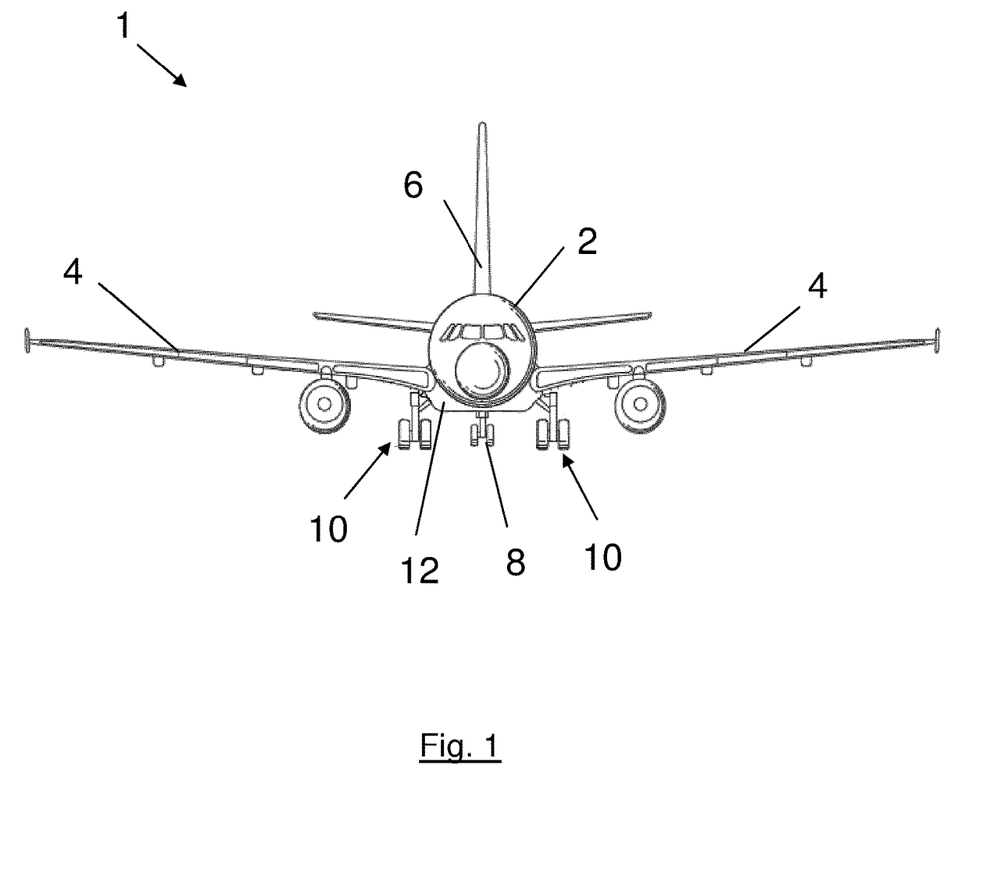
FIG. 1 shows a perspective view of an aircraft comprising a landing gear according to a first example embodiment of the invention.

FIG. 1 shows an aircraft 1 having a fuselage 2, two wings 4 mounted thereon, a tail assembly 6 and a nose landing gear 8. The aircraft 1 further comprises two main landing gear 10 (hereafter 'landing gear') in accordance with a first example embodiment of the invention. One landing gear 10 is mounted on either side of the fuselage 2. A belly fairing 12 extends around the underside of the fuselage 2 thereby fairing elements of the landing gear 10 at the point the landing gear 10 joins the fuselage 2.

Figure 2:
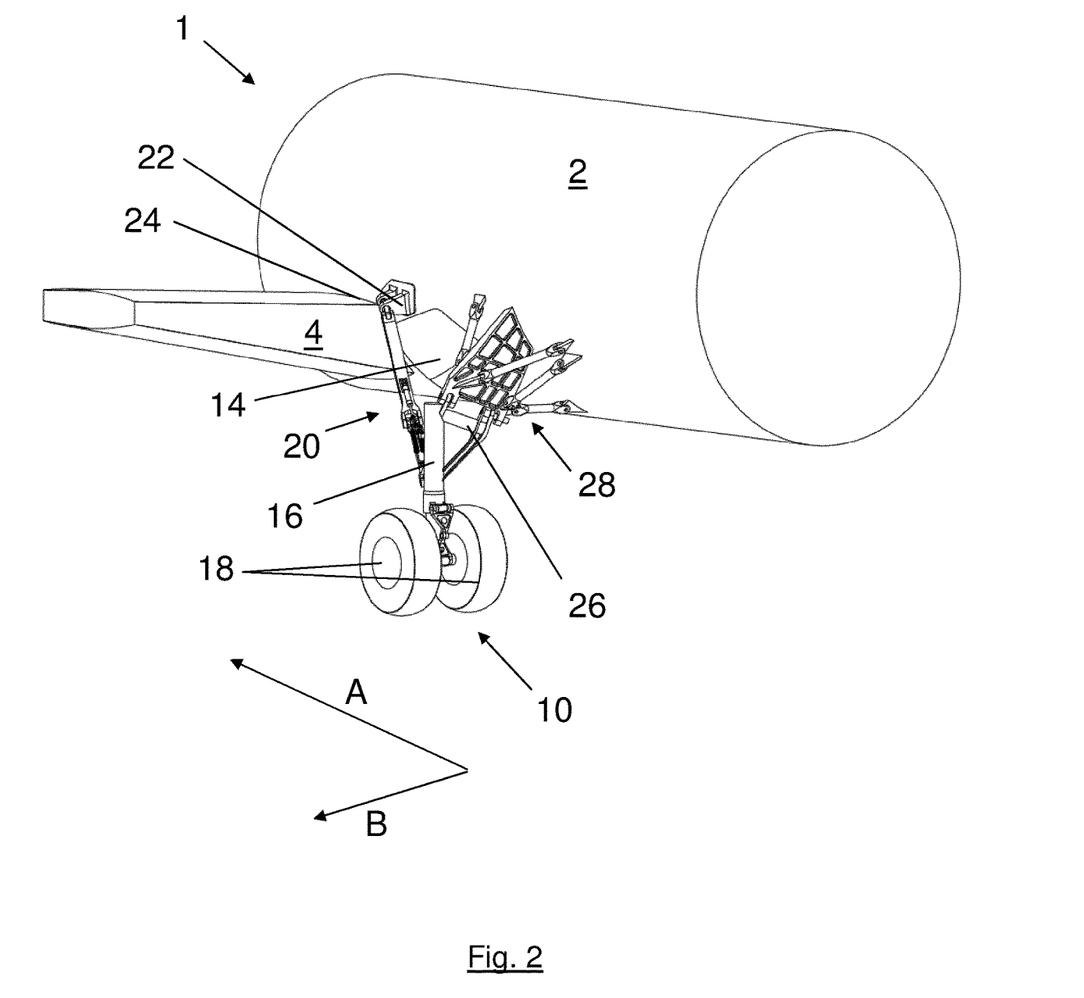
FIG. 2 shows a close up view of a portion of the aircraft of FIG. 1.

FIG. 2 shows a close up of a portion of the aircraft 1 and the landing gear 10 of FIG. 1. The landing gear 10 is in the extended configuration (i.e. the configuration used for landing and/or taxiing) in FIG. 2. It will be appreciated that the fuselage 2 and wing 4 are shown in a highly schematic form in FIG. 2. Arrows A and B indicate the forward and outboard directions respectively. A landing gear bay 14 is formed in the fuselage 2 aft of the wing 4. The landing gear 10 comprises a main strut 16 having two wheels 18 mounted at its distal end. In FIG. 2 the wheels are in a so-called 'diablo' arrangement. In other embodiments bogies comprising more than two wheels may be used. A drag stay assembly 20 is connected at one end to the main strut 16 and extends forward and inboard, the other end of the drag stay assembly 20 being attached to a bracket 22 attached to the fuselage 2 at a point located aft of the root 24 of the wing 4 and forward of the landing gear bay 14. A landing gear main fitting 26 (hereafter 'LG main fitting') is attached to the main strut 16 and to a fuselage main fitting assembly 28 (hereafter 'F main fitting') attached to the fuselage 2 at points located aft of the landing gear bay 14. In some embodiments, the drag stay 20 may be connected to (for example via a bracket attached to) the rib of the wing that forms an interface between the fuselage and the wing, sometimes referred to as 'Rib 1'. As this rib lies on the envelope defined by the fuselage it may be considered as forming part of the fuselage for the purposes of the present invention. Likewise, in some embodiments the drag stay may be attached to structure, for example the wing box, that lies within the envelope of the fuselage but which may sometimes be thought of as forming part of the wing structure.

Figure 3:
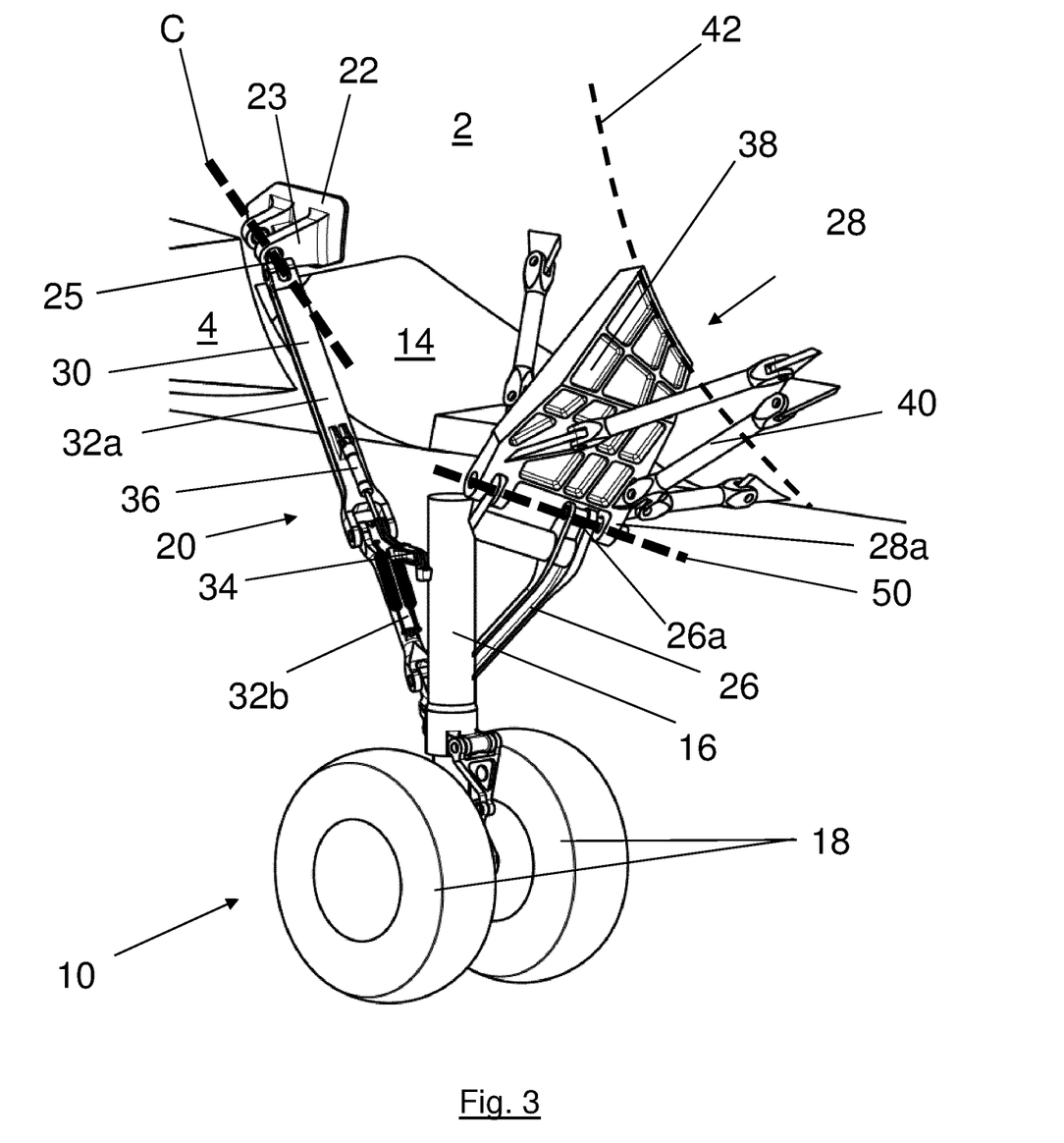
FIG. 3 shows a close up view of the landing gear of FIGS. 1 and 2.

FIG. 3 shows a close up of the landing gear 10 of FIGS. 1 and 2, again the landing gear 10 is in the extended configuration. Bracket 22 comprises a gudgeon 23. Drag stay assembly 20 comprises a folding drag stay 30 having two drag stay members 32 pivotally connected to each other at a first end. One of the drag stay members 32a is pivotally connected at the other end to the bracket 22 via a pintle 25 attached to the end of drag stay member 32a and received in gudgeon 23 for rotation about an axis (denoted by the dotted line labelled C in FIG. 3). The other of the drag stay members 32b is pivotally mounted to the main strut 16. Drag stay assembly 20 further comprises a locking member 34 extending between the main strut and drag stay member 32b and a locking actuator 36 mounted on drag stay member 32a and connected to the locking member 34.

Still referring to FIG. 3, LG main fitting 26 defines a pintle 26a which is connected to a corresponding gudgeon 28a formed on F main fitting 28 thereby forming a hinge having an axis of rotation (hereafter 'the landing gear axis') denoted by the dotted line labelled 50 in FIG. 3. The landing gear axis 50 is non-parallel with both the longitudinal and lateral axis of the aircraft 1. The F main fitting 28 comprises a main beam 38 having a gudgeon 28a formed thereon and a plurality of rods 40 extending between main beam 38 and the fuselage 2. Main fitting 28 is mounted to the fuselage 2 at the rear pressure bulkhead 42, denoted by a dashed line in FIG. 3. In other embodiments, the main fitting 28 may be mounted to the fuselage 2 at a different location.

Figure 7:
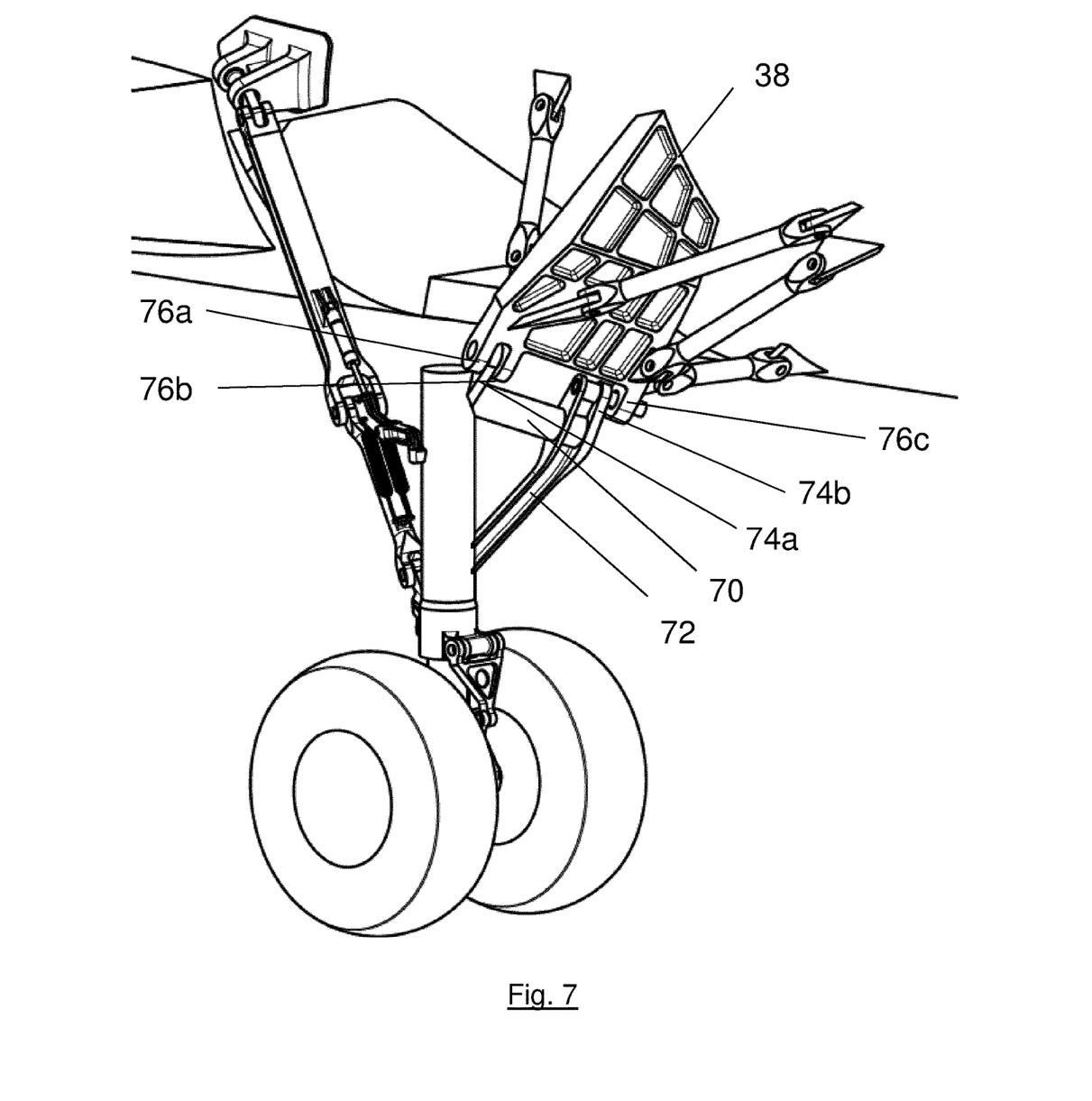
FIG. 7 shows a close up view of the connecting parts of the landing gear of FIGS. 1, 2 and 3.

Referring also to FIG. 7, LG main fitting 26 is generally inboard from main strut 16 and comprises a beam 70 generally parallel with the landing gear axis 50 and connected to the top of the main strut at one of the beam's ends. The LG main fitting 26 further comprises a support 72 that connects to the distal end of beam 70 and to a point further down main strut 16 to provide appropriate structural support to beam 70. On top of the beam 70 the pintle 26a is provided by a series of protrusions 74a, 74b. F main fitting 28 has the gudgeon 28a formed by a complementary series of protrusions 76a, 76b, 76c.

First LG protrusion 74a sits between first and second F protrusions 76a, 76b and between them are coupled by a pin. Second LG protrusion 74b is formed integrally with support 72 and has a protruding pin which is received in and extends somewhat beyond third F protrusion 76c. The connection between LG main fitting 26 and F main fitting 28 may be any appropriate type for providing rotation around landing gear axis 50. Any combination of lugs, pins, pintles and gudgeons may be suitable. Either of the LG main fitting 26 or F main fitting 28 may carry a pintle and/or a gudgeon as appropriate. A combination of connecting features may be used in any number to provide the appropriate characteristics to the connection.

In use, landing gear loads are transferred to the aircraft via drag stay assembly 20 and LG main fitting 26 and accordingly, for landing gear in accordance with the present embodiment, all landing gear loads are transferred into the aircraft at the fuselage 2, bypassing the wing 4. Less additional reinforcement of the fuselage may be required in comparison with the additional reinforcement of the wing required to react the same landing gear loads thereby reducing aircraft weight. Further, space within the fuselage for additional reinforcement may be less constrained in comparison with the wing thereby facilitating integration of the landing gear into the aircraft. In particular, in the present embodiment, the drag stay assembly 20 is connected the aircraft in the region where the wing 4 joins the fuselage 2. The region where the wing 4 joins the fuselage 2 is already highly reinforced and accordingly, less additional reinforcement may be required to deal with the landing gear loads transmitted via the drag stay assembly 20.

The combination of the drag stay assembly 20 and LG main fitting 26 may provide a mechanically simple way of body-mounting a landing gear. This arrangement may also facilitate a kinematic allowing storage of the landing gear 10 within the landing gear bay 14 formed within fuselage 2, as discussed in more detail below with reference to FIGS. 3 to 6.

The use of a F main fitting 28 comprising a main beam 38 and a plurality of rods 40 may facilitate a reduction in the amount of material (and therefore the weight) of the F main fitting by allowing the amount of material in each rod and/or the beam to be reduce to the minimum required to react the relevant load vector. Additionally or alternatively having a F main fitting 28 comprising a main beam 38 and a plurality of rods 40 may allow multiple points of connection to the fuselage and/or allow the points via which the F main fitting 28 is connected to the fuselage to be located in areas of structural strength, thereby reducing the need for additional reinforcement.

As shown in FIG. 7, main beam 38 may be formed as a web or be skeletonised in order to further reduce the weight of the F main fitting by further reducing the amount of material required. The plurality of rods 40 are connected to the main beam 38 close to the F main fitting 28, reducing the loads that the main beam 38 will have to bear. Accordingly much of main beam 38 may be a web or "skeletonised" to further reduce the weight of the assembly. As shown in the Figures, the rods may be unequally distributed around main beam 38, for example having more on the side of the landing gear away from the drag stay assembly 20 to improve resistance to forces in other directions.

Figure 4:
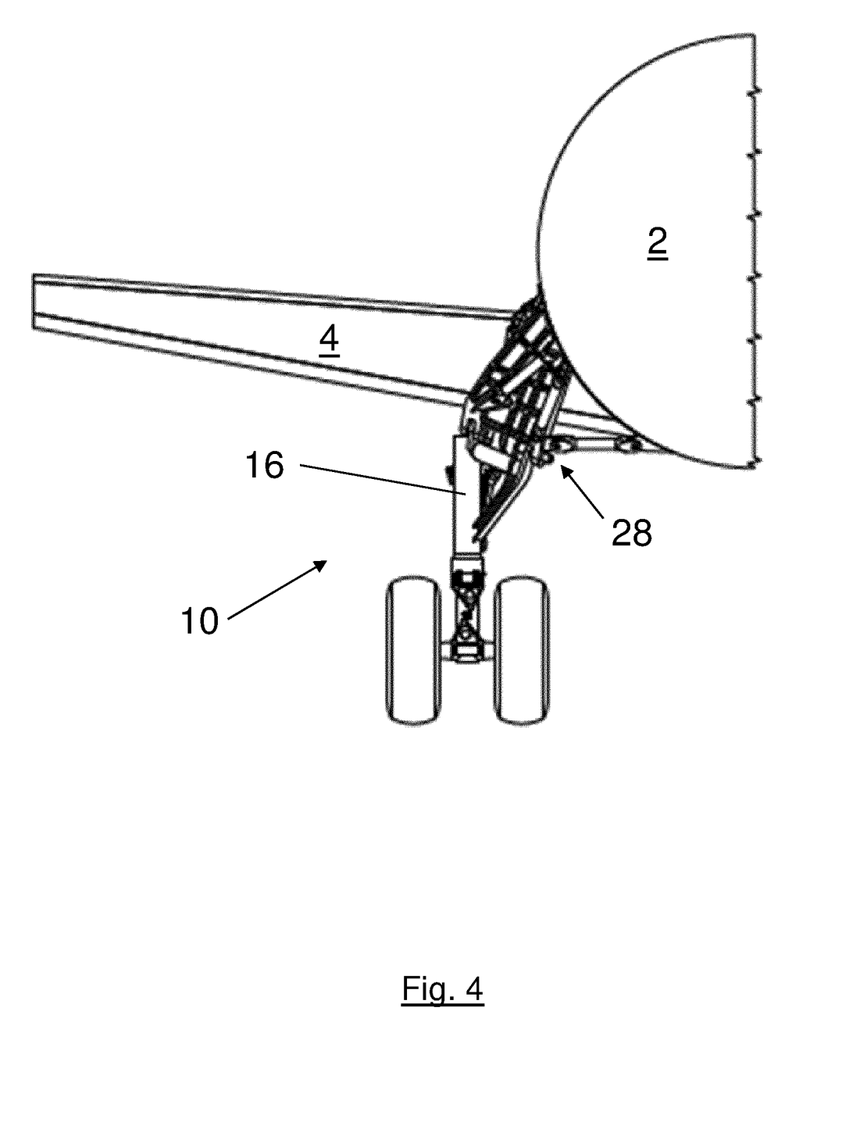
FIG. 4 shows a rear view of a portion of the aircraft of FIG. 1.

FIG. 4 shows a rear view of the aircraft 1 and landing gear 10 of FIGS. 1 to 3, again the landing gear is in the extended configuration.

Figure 5A:
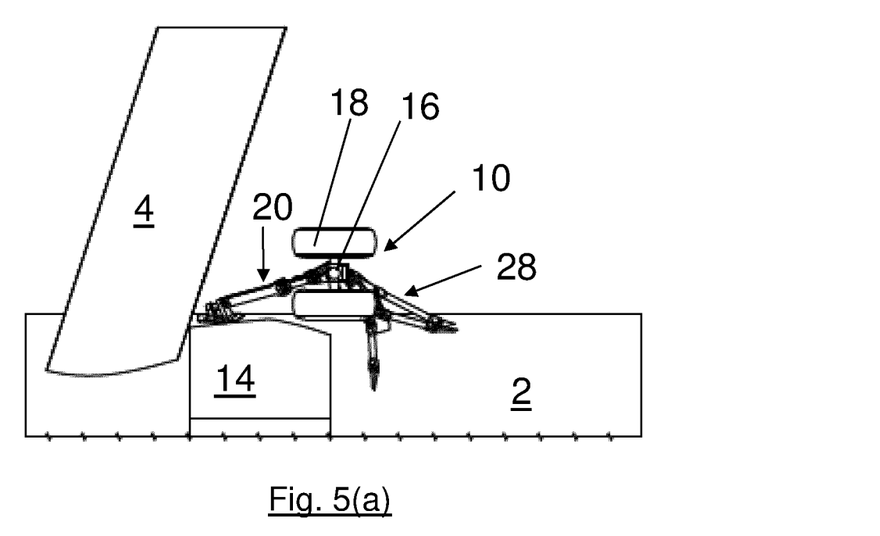
Figure 5B:
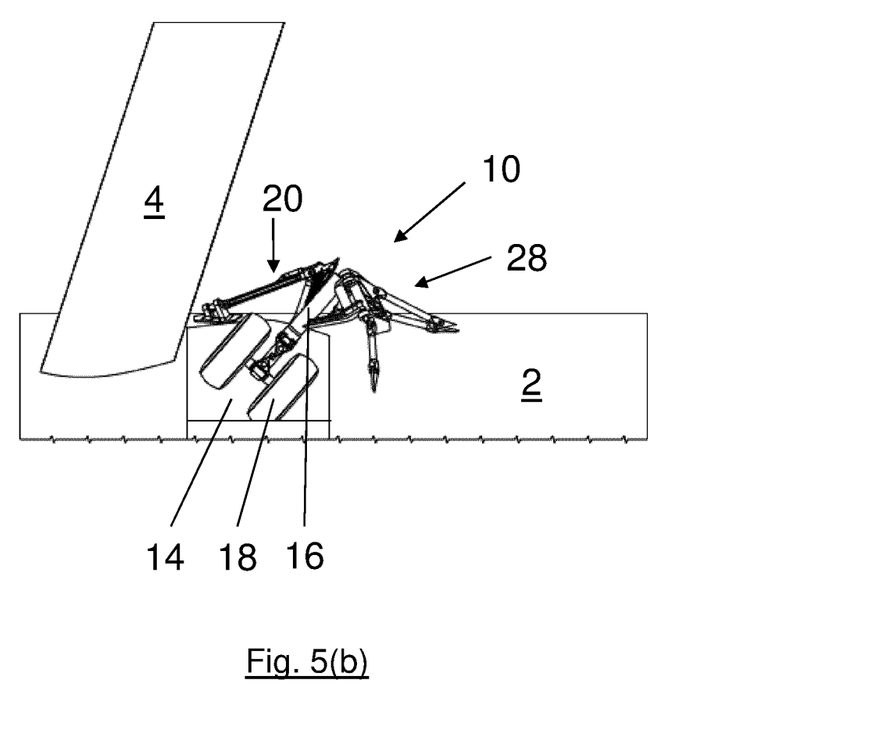

FIGS. 5 (a) and (b) show a plan view of the landing gear 10 of FIGS. 1 to 4 in the extended and retracted configurations respectively.

Figure 6A:
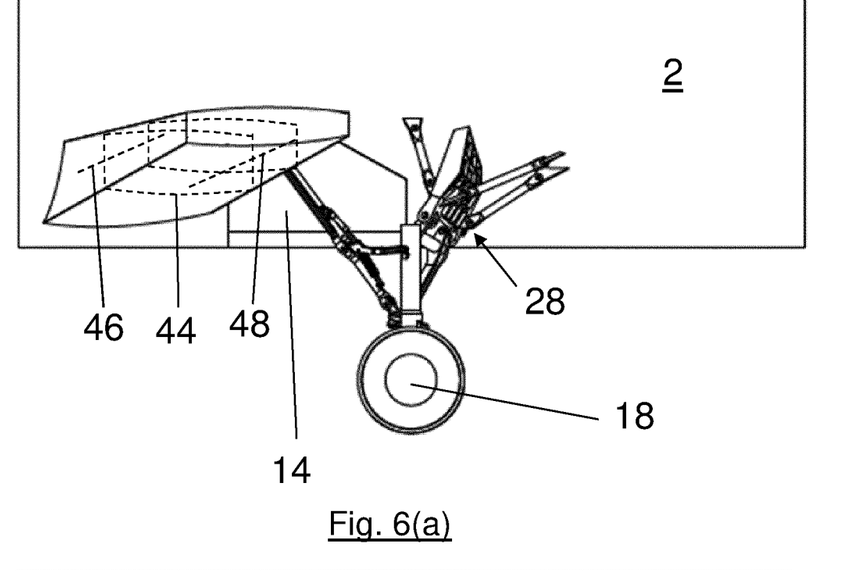
Figure 6B:
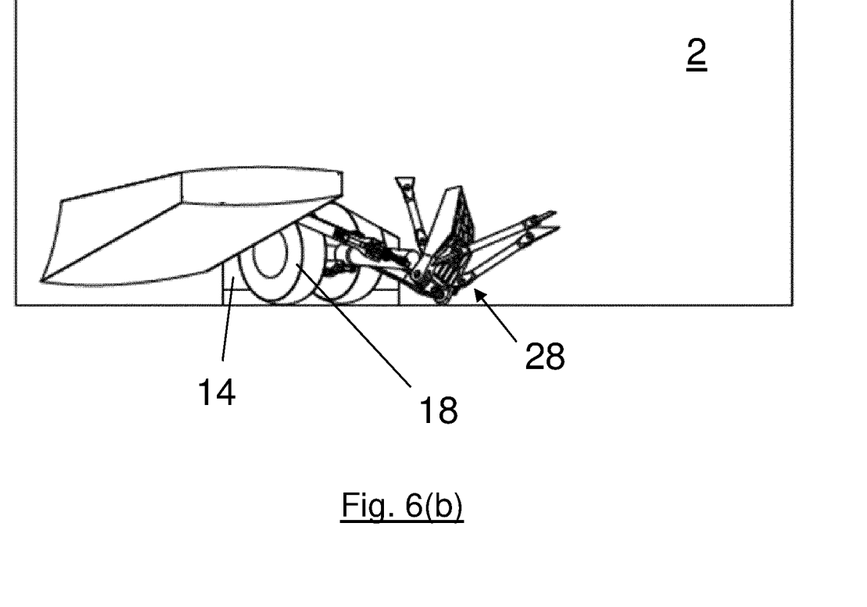

FIGS. 6 (a) and (b) show a side view of the landing gear 10 of FIGS. 1 to 5 in the extended and retracted configurations respectively. Various elements of the internal structure of wing 4 including ribs 44, front spar 46 and rear spar 48 are indicated by dashed lines in FIG. 6a.

In the extended configuration, the main strut 16 is substantially vertical and is located outboard of the fuselage 2 and aft of the wing 4 (see. FIGS. 5(a) and 6(a)).

In the retracted configuration almost the entirety of the wheels 18 are located within landing gear bay 14 and the main strut 16 is inclined slightly above the horizontal (see FIGS. 5(b) and 6(b)). When viewed in plan (see FIG. 5) it is apparent that the lower end of the main strut 16 has rotated forward and inboard as the landing gear 10 has retracted.

As discussed above the landing gear axis 50 is non-parallel with both the longitudinal and lateral axis of the aircraft 1, accordingly in landing gear in accordance with the present embodiment the main strut 16 (and wheels 18 mounted thereon) can move both forward and inboard allowing elements of the landing gear (in this case the wheels 18) to be stored within a landing gear bay 14 formed in the fuselage 2 aft of the wing 4 when the aircraft is in flight. Thus, landing gear in accordance with the present embodiment may facilitate integration of the landing gear into the aircraft. In some embodiments the landing gear axis may be substantially parallel to the longitudinal or lateral axis of the aircraft. For example, in some configurations a landing gear axis substantially parallel to the longitudinal axis of the aircraft may allow the main strut to rotate inboard such that the wheels and/or other elements of the landing gear are received in a landing gear bay formed in the fuselage.

It will be appreciated that while the landing gear 10 and main fitting 28 are shown exposed in the figures described above, in use, one or more drag reducing fairings would cover some or all of these elements.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a fuselage and a retractable landing gear assembly mounted on the fuselage, the landing gear assembly comprising:
    a main strut
    a drag stay, a first end of the drag stay being attached to the main strut and a second end of the drag stay being connected to the fuselage such that landing gear loads can be transferred into the fuselage of the aircraft from the drag stay;
    a landing gear main fitting, a first end of the landing gear main fitting being attached to the main strut and a second end of the main fitting being connected to the fuselage such that landing gear loads can be transferred into the fuselage of the aircraft from the landing gear main fitting;
    and wherein, in use, when the landing gear assembly is in an extended configuration relative to the fuselage, the landing gear loads experienced by the landing gear are only transferred from the landing gear to the fuselage via one or more of the drag stay and the main fitting.

2. An aircraft according to claim 1, the aircraft comprising a wing having a rear spar and the fuselage comprising a fuselage airframe, and wherein the main strut is located aft of the rear spar and/or outboard of the fuselage airframe when the landing gear is in the extended configuration.

3. An aircraft according to claim 1, the fuselage comprising a fuselage airframe and a wheel assembly mounted to a distal end of the main strut and wherein at least part of the wheel assembly is received within a recess formed in the fuselage airframe when the landing gear assembly is in a retracted configuration relative to the fuselage.

4. An aircraft according to claim 1, the landing gear main fitting being pivotally connected to the fuselage for rotation about a landing gear axis such that the main strut can be rotated between an extended position and a retracted position relative to the fuselage and wherein the landing gear axis is inclined with respect to both a longitudinal axis and a lateral axis of the aircraft.

5. An aircraft according to claim 4, wherein the inclination of the landing gear axis causes a distal end of the main strut to move inboard, forward and upward as the main strut moves from the extended position towards the retracted position.

6. An aircraft according to claim 4, wherein the landing gear axis is inclined at an angle of 45 degrees with respect to both the longitudinal axis and the lateral axis of the aircraft.

7. An aircraft according to claim 1, the aircraft comprising a wing and wherein the second end of the drag stay is connected to the fuselage in the region where the wing joins the fuselage.

8. An aircraft according to claim 7, the wing comprising a rear spar and wherein the drag stay is attached to a point on the aircraft located aft of the rear spar.

9. An aircraft according to claim 7, the wing comprising a plurality of ribs and wherein the drag stay is connected to the fuselage via one of said ribs, located at the interface between the fuselage and the wing.

10. An aircraft according to claim 7, wherein the drag stay extends forward from the main strut so that the second end of the drag stay is located forward of the first end of the drag stay.

11. An aircraft according to claim 1, the aircraft comprising a bulkhead, and wherein the landing gear main fitting is connected to the fuselage via an aircraft main fitting attached to the bulkhead.

12. A method of operating a landing gear assembly mounted on an aircraft fuselage, the landing gear assembly comprising a main strut connected to the fuselage by a drag stay and a main fitting,
    the method comprising the steps of:
    rotating the main strut about a landing gear axis to move the landing gear assembly from an extended configuration to a retracted configuration relative to the fuselage, and while the landing gear is in extended configuration, all the landing gear loads experienced by the landing gear are transferred to the fuselage by one, or at most both, of the drag stay and main fitting.

13. A method according to claim 12, wherein the landing gear axis is inclined relative to a lateral and a longitudinal axis of the aircraft and the step of rotating the main strut about the landing gear axis comprises the distal end of the main strut moving inboard, forward and upward.

14. A landing gear assembly comprising:
    a main strut having at least one pair of wheels mounted at a first end, each pair of wheels being arranged to rotate about a wheel axis;
    a drag stay, a first end of the drag stay being attached to the main strut and a second end of the drag stay for connecting to the fuselage of an aircraft;
    a landing gear main fitting for connecting the landing gear to the fuselage of an aircraft, the landing gear main fitting being attached to the main strut and defining a pivot axis about which the main strut can rotate;
    and wherein the pivot axis is inclined an angle of at least 20 degrees with respect to each wheel axis such that the first end of the main strut moves forward and inboard as the main strut rotates about the pivot axis from an extended position to a retracted position.

15. An aircraft comprising a fuselage and a retractable landing gear assembly mounted on the fuselage, the landing gear assembly comprising:
    a main strut
    a drag stay, a first end of the drag stay being attached to the main strut and a second end of the drag stay being connected to the fuselage such that landing gear loads can be transferred into the fuselage of the aircraft from the drag stay;
    a landing gear main fitting, a first end of the landing gear main fitting being attached to the main strut and a second end of the main fitting being connected to the fuselage such that landing gear loads can be transferred into the fuselage of the aircraft from the landing gear main fitting;

and wherein, in use, when the landing gear assembly is in an extended configuration relative to the fuselage, the landing gear has at most two load-bearing elements via which the landing gear loads experienced by the landing gear are transferred from the landing gear to the fuselage, a first one of said load-bearing elements being the drag stay and a second one of said load-bearing elements being the main fitting.

* * * * *